United States Patent [19]
Boissonnet et al.

[11] Patent Number: 5,904,794
[45] Date of Patent: May 18, 1999

[54] DECAL FOR VULCANIZED TIRES AND METHOD OF OBTAINING A TIRE HAVING A COLORED MOTIF

[75] Inventors: Monique Boissonnet; Jean-Michel Tatraux-Paro, both of Clermont-Ferrand, France

[73] Assignee: Compagnie Generale des Etablissements Michelin-Michelin & CIE, Clermont-Ferrand, France

[21] Appl. No.: 08/893,377

[22] Filed: Jul. 21, 1997

[30] Foreign Application Priority Data

Jul. 31, 1996 [FR] France ................................. 96 09772

[51] Int. Cl.$^6$ .......................... B44C 1/165; B29B 17/00; B32B 3/10; B29C 43/22
[52] U.S. Cl. .......................... 156/230; 156/116; 156/240; 156/247; 156/252; 156/277; 156/540; 428/131; 428/139; 428/207; 264/509
[58] Field of Search ..................................... 156/230, 234, 156/237, 239, 240, 241, 244.16, 244.27, 247, 277, 289, 116, 384, 252, 540; 428/131, 136, 139, 137, 138, 140, 195, 202, 207, 914; 152/523, DIG. 12; 264/509

[56] References Cited

U.S. PATENT DOCUMENTS

| | | | |
|---|---|---|---|
| 2,188,866 | 1/1940 | Poschel | 41/33 |
| 4,846,912 | 7/1989 | Noel | 156/212 |
| 4,902,554 | 2/1990 | Lang | 428/195 |
| 5,300,164 | 4/1994 | DeTrano et al. | 156/116 |
| 5,315,764 | 5/1994 | Robbins | 33/613 |
| 5,494,726 | 2/1996 | Inomata | 428/131 |
| 5,527,407 | 6/1996 | Gartland et al. | 156/64 |

FOREIGN PATENT DOCUMENTS 701913  3/1996  European Pat. Off. .

*Primary Examiner*—David A. Simmons
*Assistant Examiner*—J. A. Lorengo
*Attorney, Agent, or Firm*—Baker & Botts, L.L.P.

[57] ABSTRACT

A method for obtaining a tire comprising a colored motif and a decal intended to be applied to the outer surface of a vulcanized rubber tire. The decal is made of a thin sheet serving as temporary support for a motif made with one or more vulcanizable colored inks. The support has at least one cutout having a shape adapted to permit the fitting therein of at least one element in relief protruding from the surface of a tire at the place selected for the colored motif.

2 Claims, 1 Drawing Sheet

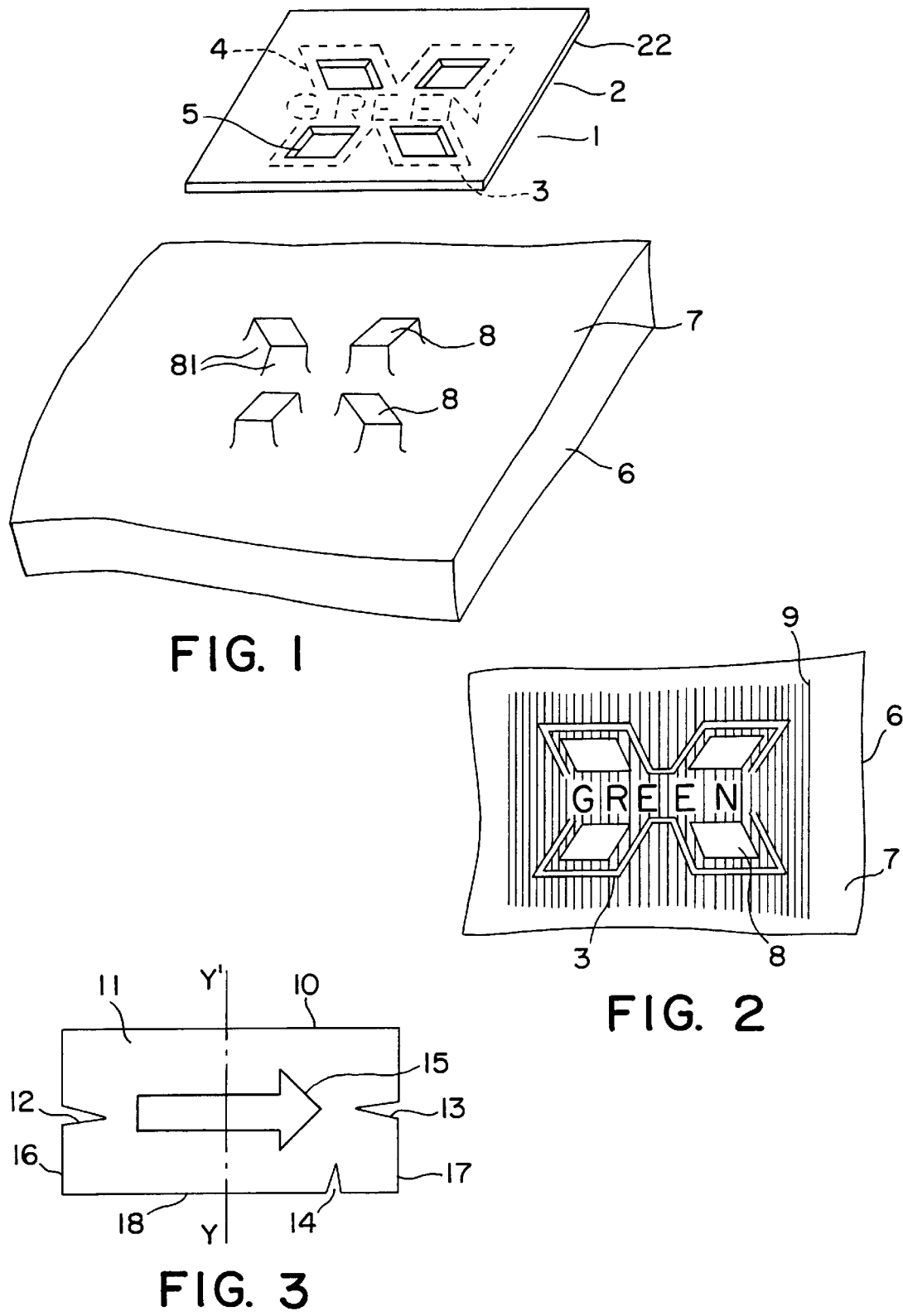

DECAL FOR VULCANIZED TIRES AND METHOD OF OBTAINING A TIRE HAVING A COLORED MOTIF

BACKGROUND OF INVENTION

The present invention relates to decals comprising a colored motif, as well as to a method of obtaining a vulcanized rubber tire having a colored motif on one of its outer surfaces.

The interest displayed by customers in the aesthetic appearance of the articles which they may purchase is increasing. In fact, it is well known that an article which has a visible decoration and, what is more, decorations in different colors, represents an additional attraction. Furthermore, as is the case in the tire industry, the standards in force require an increasing number of markings on the sidewalls of tires; it therefore appears particularly useful to be able to distinguish some of these markings from others, and one of the means of accomplishing this is by depositing on the outer surface of a tire at least one colored ink employed in accordance with a motif corresponding to the marking desired.

It is known, for instance from U.S. Pat. No. 2,188,866, to apply a decal comprising a colored motif in order to decorate the outer surface of an article of vulcanized rubber, such as, for instance, a vulcanized tire. U.S. Pat. No. 2,188,866 discloses a decal comprising a temporary support on which at least one colored ink has been deposited, in accordance with a predetermined motif, in a relatively slight thickness as compared with the thickness of the support. This ink is so formulated that it can be transferred onto the article to be decorated under conditions of pressure and temperature which are suitable in order to obtain good adherence on a previously vulcanized rubber mix while remaining sufficiently elastic after transfer. By elastic, it is understood that the ink transferred is sufficiently deformable to be able to follow the deformations of the surface of the article onto which it has been transferred during the subsequent use of said article.

One of the difficulties encountered in the development and carrying out of such a method for decorating articles, such as tires, resides in the fact that it is difficult to position the decal accurately on the tire before effecting the transfer of the motif. This difficulty is related to the geometry of the surface on which this decal is placed and the texture of said surface (grooves, hollows, bosses, more or less slippery conditions, etc.). It is easily seen that it is necessary to position the decal properly so that, after the transfer of the ink from the motif onto the tire, the motif is in a position which has been previously selected; this correct positioning requires a relatively lengthy period of adjustment which, from an industrial standpoint, limits the use of a decal in order to produce a decoration on a vulcanized tire.

Furthermore, it may happen that the motif, even though correctly positioned on the tire to be decorated, is not properly oriented with respect to the tire itself; this may take place in the event that it is desired to indicate by means of an arrow a preferred direction of a tire provided with a tread which establishes a preferred direction of rotation for the tire. This leads to the necessity of additional operations of verification after the putting in place of a motif by thermal transfer; these verifications are, to be sure, expensive and are not without an influence on the final price of the product provided with a motif.

It must be added that defects in the position and/or orientation of a motif are particularly visible since said motif is in general of a different color than that of the tire. The presence of these defects makes it necessary in most cases to act, after the transfer of the motif, in order to eliminate said motif, which cannot be done easily, the ink having been formulated to adhere well to the rubber, and it requires a special tool; despite everything, the operation, however, remains difficult and may leave traces on the tire.

In order to reduce the defects in the positioning of a decal, it is possible to use complicated systems which employ luminous markers, the worker having to place the decal manually in the proper place with the proper orientation guided by luminous markings created on the surface of the tire; an alternative is to provide a device which has the function of depositing the decal in the proper place. The drawbacks inherent in these systems are of a financial nature since it is necessary to invest in costly machines (and in sufficient number).

SUMMARY OF THE INVENTION

The decal and the method of obtaining a tire having a colored motif in accordance with the invention are directed to solving the problems and eliminate the drawbacks which have been mentioned above.

The method of the invention makes it possible to obtain a tire or a vulcanized rubber article on the surface of which there is applied a decal the positioning of which is as correct as possible and which requires only a device which effects the transfer of the inked motif.

There is proposed a method of obtaining an article provided with at least one colored motif deposited by thermal transfer from a decal on said molded and vulcanized article. The method of the invention is characterized by the fact that it comprises the following steps:

the said article is molded and vulcanized in such a manner that on its surface, close to the place where the colored motif is to be deposited, there is at least one element in relief which protrudes slightly from said surface;

a decal is provided, in a manner known per se, by depositing at least one vulcanizable colored ink in accordance with a predetermined motif on a thin support, a number of cutouts at least equal to the number of elements in relief on the article are made in the support for the decal, said cutouts being adapted to the geometry and the arrangement of the elements in relief, the decal is placed on the article in such a manner that the elements in relief on the surface of the article are introduced into the cutout parts of the support of the decal so as to hold the decal in proper position before the phase of pressing and transferring the motif onto the article. Finally, the thermal transfer of the ink from the motif to the surface of the article is effected.

By thermal transfer, there is meant the process which makes it possible to transfer onto the surface of an article of vulcanized rubber an inked motif which has been previously formed on a support and consisting, after having placed the ink of the motif in contact with said surface, in exerting a pressure on the support while contributing sufficient heat to effect the transfer of the motif onto said surface. The pressures and temperatures used in such a process are between 0.2 and 8 bars and 100° C. and 300° C., respectively.

Such a process is well-adapted to the transfer of a decal onto a vulcanized molded tire having on the outer surface of at least one of its sidewalls elements in relief arranged in such a manner as to fit in cutouts made in the support of the decal, said elements having been made during the molding of the tire.

The cutouts made in a decal must have shapes and positions which correspond to the geometry and arrangement of the elements, so that once in place, there can be minimum relative movement between the decal and the elements in relief to assure good centering of the decal. This characteristic can be obtained by at least one cutout the geometry of which is substantially adapted to the geometry of the element in relief which it surrounds in the manner that the edges of the cutout are at least partially in contact with the walls of said elements in relief, or by a judicious arrangement of the cutouts and of the elements in relief, or else by a combination of the two previous measures, so as to limit the relative movements between the support of the decal and the surface of the article to be decorated after the decal has been put in place.

In accordance with the invention, there is proposed a decal intended to be applied to the surface of a vulcanized rubber article, said decal comprising a thin sheet serving as temporary support, made of a material adapted to receive one or more heat vulcanizable colored inks, formulated to adhere more to the vulcanized rubber than to the support after vulcanization of said ink or inks. This decal, which comprises at least one colored motif made with at least one vulcanizable ink, is characterized by the fact that the support has at least one cutout, outside the surface of said motif, each cutout having a shape adapted to permit the fitting therein of at least one element in relief protruding from the surface of an article at the place selected for the placing of the colored motif. The edges of the cutout or cutouts are in contact, at least in part, with the sidewalls of the elements in relief so as to center the support of the decal and, once in place, limit the possibilities of movement of the support with respect to the article.

The elements in relief intended to fit in the cutouts of the decal are made at the time of the molding of said article and have sidewalls of a relative height, measured with respect to the surface of the article to be decorated, which is sufficient in order to hold the decal in the desired position without, however, preventing its application on to the article in order to effect the transfer of the motif; this height is, for instance, at least equal to the thickness of the sheet forming the support of the decal.

By temporary support, there is understood a support made in the form of a thin sheet adapted to receive at least one colored ink for the making of a motif, said support being eliminated after the operation of transfer of the ink onto the article of vulcanized rubber.

The decal in accordance with the invention can be produced by screen printing and different types of supports can be employed, such as, for instance, ethylene polyetherphthalate (PET), aluminium, or Mylar.

For the support of a decal there is preferably selected a material which can be made in the form of a thin sheet which can be subjected to a range of molding temperatures between 100° C. and 250° C. so that said support can follow and adopt, in its smallest details, the geometry of the surface of the article on which the decal is placed.

The cutouts can be made in the support before the depositing the inked motif on the support or else afterwards.

The invention also has the advantage that it is not necessary to use a transparent support in order to effect a verification of the motif, since cutouts are provided which assure a good locating of the decal on the surface of the tire to be decorated.

In the case of a tire, the method of the invention makes it possible easily and precisely to renew the marking during the life of the tire should this be felt necessary or in case of the total erasure of the original motif, it is also possible to deposit a new, entirely different motif but employing the same elements of relief on the tire.

This decal and the method of obtaining a tire having a colored motif transferred by thermal transfer offer the advantage of being able to be used at any industrial and commercial site having merely equipment which permit applying pressure and heating said decal in order to effect the thermal transfer of the motif onto the outer surface of a vulcanized tire.

Advantageously cutouts may be made in accordance with a suitable distribution on the support of the decal, as well as elements of relief on the surface of the tire to be decorated in accordance with an identical distribution, in such a way that there is only one possibility for fitting said elements of relief in said cutouts and therefore only a single possible position of the decal.

In the case of a tire, the elements of relief on the sidewalls of said tire which serve for the positioning of the decal also play a role as protection of the inked motif against scraping and rubbing of the tire against various objects (curb, etc.).

DESCRIPTION OF THE DRAWINGS

The figures shown are for the purpose of facilitating an understanding of the invention and are not to be considered limitative.

FIG. 1 shows diagrammatically the phase of the putting in place of a decal according to the invention on the outer surface of one of the sidewalls of a tire.

FIG. 2 shows the surface of the tire of FIG. 1 after the thermal transfer of an inked motif.

FIG. 3 shows another variant of a decal having cutouts in the form of notches located on the edges of the decal.

DESCRIPTION OF PREFERRED EMBODIMENTS

FIG. 1 is a partial view of the outer surface 7 of a vulcanized rubber tire 6 on which there is to be applied a decal 1 formed of a sheet 22 forming a thin support 2, on which support there has been previously deposited by screen printing a colored ink 3 in accordance with a predetermined motif (in this case the letter "X" and the "GREEN" are shown in dashed line in order to indicate that they are visible by transparency).

The support 2 of the decal 1 is made of cellulose acetate and has a thickness of 0.05 mm; on one of the faces of said support, an ink of green color has been deposited by screen printing in order to form the motif desired.

The ink 3 employed is formulated from an elastomeric base to which a color pigment has been added. This ink has been deposited on the support in a slight thickness of between 0.003 and 0.025 mm. Furthermore, it has the characteristic of being heat vulcanizable and of adhering more to the rubber of the vulcanized tire than to the support 2 by thermal transfer and of remaining elastic after vulcanization.

In general, the pigments used can be selected in a sufficiently broad range of colors to increase the legibility of the motif on white or black surfaces or surfaces of any other color employed in the rubber industry and, more particularly, in the tire industry.

The surface 7 of the tire 6 is provided with four elements in relief 8, each element having a cross section, parallel to the surface 7 of the tire, the shape of which is close to that of a diamond; these elements have side walls 81 which in the present case are substantially perpendicular to the surface 7 of the tire 6 and the height of which, measured with respect to the surface of the tire, is about 0.5 mm. The support 2 of the decal 1 has four cutouts 5 of diamond shape passing through said support, each cutout having an area slightly greater than the area of the cross section of the elements in relief 8. The cutouts 5 are arranged in such a manner as to be integrated in the selected motif; in the present case, each cutout is placed in one arm of the "X" motif.

The sequence of operations consists in positioning the decal 1 in such a manner that the elements in relief 8 on the surface 7 of the tire 6 fit into the cutouts 5, the side walls of the elements in relief 8 being in contact with the edges of the cutouts, and then exerting a pressure on the decal against the surface 7 before vulcanizing and transferring the ink 3 of the motif onto said surface and finally removing the support 2 from the surface 7, thus obtaining a tire 6 decorated with a colored motif such as that shown diagrammatically in FIG. 2.

Furthermore, in advantageous manner, there has been provided an assembly of fine striations 9 forming a relief of a height of 0.25 mm on the surface of the tire and in the vicinity of the relief elements serving as guides for the placing of the decal; these fine striations 9 on and in which the ink 3 of the motif is deposited supplement the protection of the fine thickness of ink 3 deposited from being worn away by rubbing. The support 2 of the decal 4 produced, in the present case of cellulose acetate, is of particular interest since, taking into account the breadth of its range of softening temperatures which permit the molding, it acquires, under the action of the heat, a flexibility which permits the depositing of the ink of the motif on and in the relief formed by the fine parallel striations 9.

The method of obtaining a tire having a colored motif from a decal in accordance with the invention makes it possible to eliminate any operation of verification of proper positioning, whether of the decal before transfer or of the motif after transfer, which means a gain from an economic standpoint.

FIG. 3 shows a decal 10 the support 11 of which is made of a material having the characteristic of contracting significantly during the thermal phase of the thermal transfer. It has been found that if one makes cutouts in the form of holes in the support of said decal as has just been described, a blocking of the contracting of the material of the support in the direction defined by the elements of relief on the tire, taken two by two, could be produced. This blocking of the contraction in certain directions is equivalent to a non-uniform contraction of the support and leads to a modification of the inked motif deposited on the support by more or less pronounced deformation; this alteration of the motif can be considered disturbing from an aesthetic standpoint. In order to eliminate this drawback while retaining the advantage of an easy positioning of a decal on the surface of a vulcanized tire, it is advisable to produce on the support of said decal cutouts in the form of openings or notches in the edges of said support. In this way, the contraction of the support being identical whatever the direction considered, the inked motif simply experiences a uniform reduction of a factor corresponding to said contraction without undergoing any other modification.

In the example shown in FIG. 3 which contains this last arrangement, three notches 12, 13, 14 are made in the support 11 of the decal 10 comprising a motif representing an arrow 15, each V-shaped notch being formed in one of the edges 16, 17, 18 of said support. Thus, it is easy to place the decal in proper position, since the elements in relief are provided to cooperate with edges of the notches upon the putting in place of the decal without, however, blocking the deformations of thermal contraction of the support of the decal during the thermal transfer.

Furthermore, the arrangement of the notches has been determined in such a manner that there is only a single possible position for the decal 10 on an outer surface of a tire having three elements in relief distributed in accordance with a similar arrangement. For this, two notches 12 and 13 are arranged on two opposite edges 16, 17 of the support 11 at the center of said edges, while the third notch 14 is made on a third edge 18 of the support 11 and in such a manner as to be offset with respect to the center axis YY' of the support perpendicular to this same edge.

We claim:

1. A process of thermal transfer of a colored motif from a decal onto a surface of a molded and vulcanized rubber article, the process comprising the following steps:

molding on a surface of the molded and vulcanized article, at the place where the colored motif is to be deposited, at least one element in relief protruding slightly from said surface;

producing a decal by depositing on a thin support at least one vulcanizable, colored ink in accordance with the predetermined motif;

making cutouts in the support of the decal in a number at least equal to the number of elements in relief on the article, said cutouts being adapted to the geometry and the arrangement of the elements in relief;

placing the decal on the article in such a manner that the ink of the motif is applied against the surface of the article and that the elements in relief on the surface of the article fit in the cutout portions of the support of the decal, so as to hold the decal in an only proper position before a phase of pressing and transfer of the motif on the article;

pressing the decal against the article to transfer the ink by thermal transfer to the article.

2. A process in accordance with claim 1 in which the article is a vulcanized molded tire having on the outer surface of at least one of its sidewalls elements in relief arranged in such a manner as to fit into the cutouts made in the support of a decal before effecting the transfer of an inked motif onto said surface, said elements in relief having been made during the molding of said tire.

* * * * *